United States Patent
Oyama

(10) Patent No.: US 10,715,719 B2
(45) Date of Patent: Jul. 14, 2020

(54) IMAGE CAPTURING APPARATUS AND CONTROL METHOD THEREOF

(71) Applicant: CANON KABUSHIKI KAISHA, Tokyo (JP)

(72) Inventor: Yasufumi Oyama, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 80 days.

(21) Appl. No.: 15/892,498

(22) Filed: Feb. 9, 2018

(65) Prior Publication Data
US 2018/0234621 A1    Aug. 16, 2018

(30) Foreign Application Priority Data
Feb. 10, 2017  (JP) ................ 2017-023472

(51) Int. Cl.
*H04N 5/232* (2006.01)
*G06F 3/0488* (2013.01)
*G06F 3/0484* (2013.01)
*G06F 3/0487* (2013.01)

(52) U.S. Cl.
CPC ....... *H04N 5/23216* (2013.01); *G06F 3/0484* (2013.01); *G06F 3/0487* (2013.01); *G06F 3/04847* (2013.01); *G06F 3/04883* (2013.01); *H04N 5/23293* (2013.01)

(58) Field of Classification Search
None
See application file for complete search history.

(56) References Cited

U.S. PATENT DOCUMENTS 9,979,881 B2 * 5/2018 Yoshikawa ........ H04N 5/23206
2017/0264818 A1 * 9/2017 Liao .................... G06F 3/04817

FOREIGN PATENT DOCUMENTS

JP         2014-038195 A       2/2014

* cited by examiner

*Primary Examiner* — Twyler L Haskins
*Assistant Examiner* — Fayez Bhuiyan
(74) *Attorney, Agent, or Firm* — Carter, DeLuca & Farrell LLP

(57) ABSTRACT

An image capturing apparatus comprises: a display capable of displaying a predetermined item; a detection unit that detects a touch operation on a touch panel; an operation unit operated by a same hand as the touch panel; and a control unit that control to, if the operation unit does not accept a predetermined operation, display the predetermined item at a position on the display based on a position at which touch is started on the touch panel in response to the touch operation detected by the detection unit, and if the operation unit accepts the predetermined operation, display the predetermined item at a fixed position even if touch is started, and if the touch position is moved, move the predetermined item to a position by an amount corresponding to the moved amount of the touch position.

20 Claims, 10 Drawing Sheets

IMAGE CAPTURING APPARATUS AND CONTROL METHOD THEREOF

BACKGROUND OF THE INVENTION

Field of the Invention

The present invention relates to an image capturing apparatus and a control method thereof and more specifically to a technique at a time of performing a setting in response to a touch operation.

Description of the Related Art

There is a method of realizing various settings by touch operation while looking through a viewfinder by using a display unit provided outside the viewfinder as a touch pad. Japanese Patent Laid-Open No. 2014-38195 discloses displaying an indication of the state of operation on an eyepiece display unit when a touch operation is performed on a rear display unit while looking into the eyepiece display unit. Furthermore, it is disclosed that in the state of looking into the eyepiece display unit, a touch operation is performed with the thumb while lightly touching the release switch with the index finger.

In the state in which a shutter button is half-pressed, since a finger (for example, index finger) is placed on the shutter button, it is difficult to extend another finger (for example, thumb) of the same hand to the touch panel. Therefore, the area that can be reached on the touch panel is restricted more than in the state in which the shutter button is not touched. According to the method described in Japanese Patent Laid-Open No. 2014-38195, when a touch operation is performed in a state where the release switch is half-pressed with the index finger, the operable range is limited and there are the possibilities that the finger may not reach a desired position, and that the finger may release or fully-press the shutter button when stretching another finger in order to touch the touch panel.

SUMMARY OF THE INVENTION

The present invention has been made in consideration of the above situation, and facilitates an operability of a user when simultaneously performing a touch operation on a touch panel and a predetermined operation on an operation member using the same hand.

According to the present invention, provided is an image capturing apparatus comprising: a first display capable of displaying a predetermined item; a detection unit that detects a touch operation on a touch panel; an operation unit capable of being operated by a finger of a same hand of a finger that operates the touch panel; and a control unit that control to in a case where the operation unit does not accept a predetermined operation, display the predetermined item at a position on the first display based on a position at which touch is started on the touch panel, not based on a display position of the predetermined item before the touch is started, in response to the touch operation detected by the detection unit, and in a case where the operation unit accepts the predetermined operation, display the predetermined item on a position moved from the position where the predetermined item is displayed before the touch position is moved by an amount corresponding to the moved amount of the touch position, and not to move the predetermined item in response to starting of the touch.

Further, according to the present invention, provided is an image capturing apparatus comprising: a display that displays a predetermined item; a detection unit that detects a touch operation on a touch panel; an operation unit capable of being operated by a finger of a same hand of a finger that operates the touch panel; and a control unit that, in response to a touch position on the touch panel being moved by a first distance, controls a distance by which the predetermined item is moved on the display is made longer in a case where the operation unit accepts the predetermined operation than in a case where the operation unit does not accept the predetermined operation.

Furthermore, according to the present invention, provided is a control method of an image capturing apparatus having a display capable of displaying a predetermined item, comprising: performed by a detection unit of detecting a touch operation on a touch panel; performed by an operation unit capable of being operated by a finger of a same hand of a finger that operates the touch panel; and performed by a control unit of controlling to in a case where a predetermined operation is not accepted in the operation step, display the predetermined item at a position on the display based on a position at which touch is started on the touch panel, not based on a display position of the predetermined item before the touch is started, in response to the touch operation detected in the detection step, and in a case where the predetermined operation is accepted in the operation step, display the predetermined item on a position moved from the position where the predetermined item is displayed before the touch position is moved by an amount corresponding to the moved amount of the touch position, and not to move the predetermined item in response to starting of the touch.

Further, according to the present invention, provided is a control method of an image capturing apparatus having a display capable of displaying a predetermined item, comprising: performed by a detection unit of detecting a touch operation on a touch panel; performed by an operation unit capable of being operated by a finger of a same hand of a finger that operates the touch panel; and performed by a control unit of controlling, in response to a touch position on the touch panel being moved by a first distance, a distance by which the predetermined item is moved on the display is made longer in a case where the predetermined operation is accepted in the operation step than in a case where the predetermined operation is not accepted in the operation step.

Further, according to the present invention, provided is a non-transitory readable storage medium having stored thereon a program which is executable by an image processing apparatus, the program having a program code for realizing the control method of an image capturing apparatus having a display capable of displaying a predetermined item, comprising: performed by a detection unit of detecting a touch operation on a touch panel; performed by an operation unit capable of being operated by a finger of a same hand of a finger that operates the touch panel; and performed by a control unit of controlling to in a case where a predetermined operation is not accepted in the operation step, display the predetermined item at a position on the display based on a position at which touch is started on the touch panel, not based on a display position of the predetermined item before the touch is started, in response to the touch operation detected in the detection step, and in a case where the predetermined operation is accepted in the operation step, display the predetermined item on a position moved from the position where the predetermined item is displayed before the touch position is moved by an amount corresponding to the moved amount of the touch position, and not to move the predetermined item in response to starting of the touch.

Further, according to the present invention, provided is a non-transitory readable storage medium having stored thereon a program which is executable by an image processing apparatus, the program having a program code for realizing the control method of an image capturing apparatus having a display capable of displaying a predetermined item, comprising: performed by a detection unit of detecting a touch operation on a touch panel; performed by an operation unit capable of being operated by a finger of a same hand of a finger that operates the touch panel; and performed by a control unit of controlling, in response to a touch position on the touch panel being moved by a first distance, a distance by which the predetermined item is moved on the display is made longer in a case where the predetermined operation is accepted in the operation step than in a case where the predetermined operation is not accepted in the operation step.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

<First Embodiment>

Figure 1A:
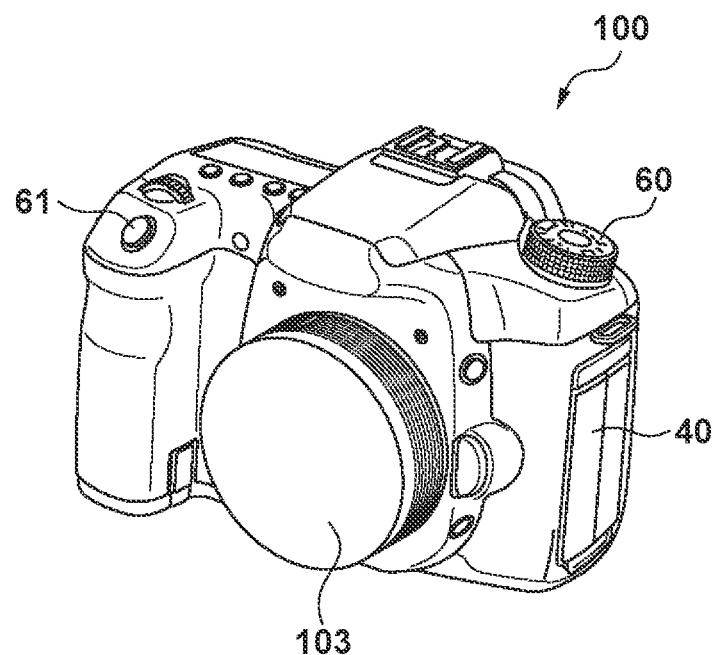
FIGS. 1A and 1B are views showing an example of a rear view of an appearance of an image capturing apparatus according to an embodiment of the present invention.
Figure 1B:
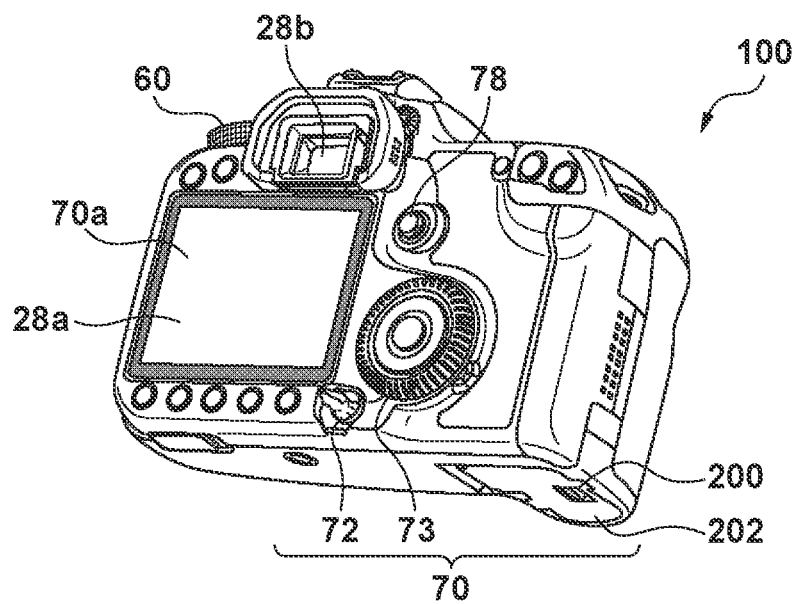

FIGS. 1A and 1B show an external view of an image capturing apparatus 100 as an example of an apparatus to which this embodiment can be applied. A rear display panel 28a is a display unit for displaying images and various information and includes a touch panel 70a. Similarly to the rear display panel 28a, an electronic viewfinder 28b (eyepiece display unit) is an electronic viewfinder capable of displaying images and various kinds of information. In the present embodiment, when the electronic viewfinder 28b is used, by operating the touch panel 70a, change of each setting item, AF position designation in the electronic viewfinder 28b, subject designation, etc. are performed. It should be noted that the optical viewfinder may be used instead of the electronic viewfinder 28b, and in that case, a transparent display portion (an eyepiece display portion) for displaying each setting item (item indicating set value) including the AF frame is provided in the optical viewfinder.

A shutter button 61 is a button for designating image capture instruction, and has a two-step switch structure which instructs preparation for image capture in response to a half pressing as described later (state in the middle of pressing the shutter button completely, the shutter button can accept half-press state), and instructs image capture in response to a full pressing. Further, in the present embodiment, by operating the touch panel 70a in a state where the shutter button 61 is half-pressed, a value change amount with respect to a touch operation amount is amplified. A mode changeover switch 60 is used for switching various modes. A power switch 72 is a push button for switching between power-on and power-off. An operation unit 70 includes various switches and buttons for accepting various operations from the user, and comprises operation members such as a touch panel 70a.

A controller wheel 73 is a rotatable operation member included in the operation unit 70, and is used for designating any of selection items, for example, together with a direction button. When the controller wheel 73 is rotated, an electrical pulse signal is generated according to the operation amount, and a system control unit 50 controls each unit of the image capturing apparatus 100 based on the pulse signal. From this pulse signal, it is possible to judge a rotation angle of the controller wheel 73, the number of rotations, and the like. It should be noted that the controller wheel 73 may be of any type as long as rotational operation of it can be detected. For example, the controller wheel 73 may be a dial operating member that rotates itself to generate a pulse signal in response to a turning operation by a user. Further, the controller wheel 73 may be an operation member (so-called touch wheel) composed of a touch sensor that detects rotation of the user's finger on the controller wheel 73, and the controller wheel 73 itself does not rotate.

A recording medium 200 is a memory card, a hard disk, or the like, and is inserted in a recording medium slot. The recording medium 200 inserted in the recording medium slot can communicate with the image capturing apparatus 100 and recording and reproduction become possible. The recording medium slot is usually covered with a lid 202.

Figure 2:
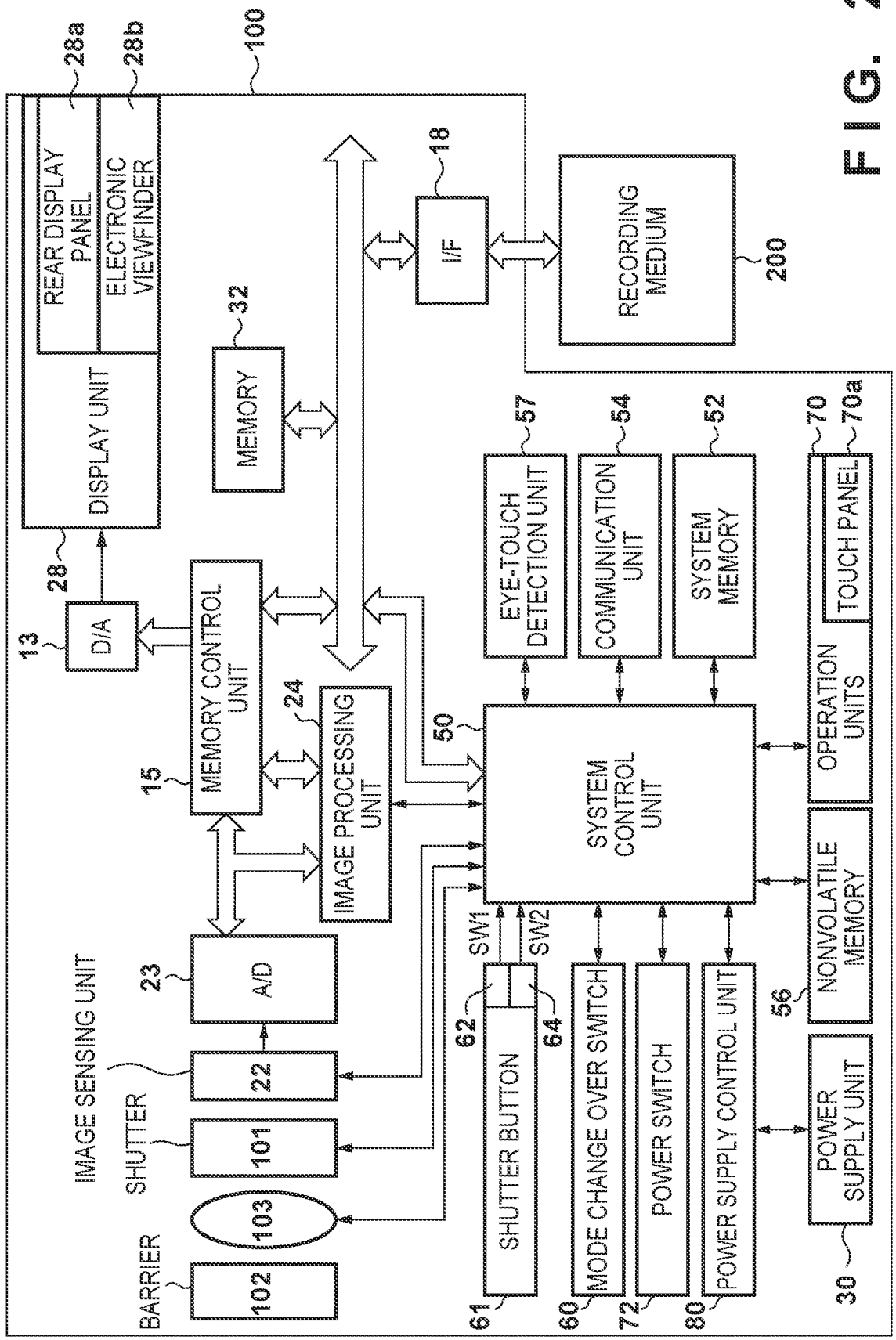
FIG. 2 is a block diagram showing a configuration of an image capturing apparatus according to the embodiment.

FIG. 2 is a block diagram showing a configuration example of the image capturing apparatus 100 according to this embodiment. In FIG. 2, an imaging lens 103 is represented by a single lens, but it is actually a lens group including a plurality of lenses such as a zoom lens and a focus lens. A shutter 101 has an aperture function. An image sensing unit 22 is an image sensor including a CCD, a CMOS device, or the like, that converts an optical image incident through the imaging lens 103 and the shutter 101 into an electric signal. An A/D converter 23 converts the analog signal output from the image sensing unit 22 into a digital signal. A barrier 102 covers the imaging system including the imaging lens 103, the shutter 101, and the image sensing unit 22 of the image capturing apparatus 100, thereby preventing contamination and breakage of the imaging system.

An image processing unit 24 performs prescribed pixel interpolation processing, resizing processing such as reduction, and color conversion processing on data from the A/D converter 23 or data from a memory control unit 15. In addition, the image processing unit 24 performs predetermined arithmetic processing using the image data output from the A/D converter 23, and the system control unit 50 performs exposure control and focus control based on the obtained calculation result. As a result, auto focus (AF) processing, automatic exposure (AE) processing and flash pre-light emission (EF) processing of the TTL (through-the-lens) method are performed. Furthermore, the image processing unit 24 performs predetermined arithmetic processing using the image data output from the A/D converter 23 and also performs auto white balance (AWB) processing of the TTL method based on the obtained calculation result.

Output data from the A/D converter 23 is written in a memory 32 via the image processing unit 24 and the memory control unit 15, or via the memory control unit 15. The memory 32 stores image data obtained by the image sensing unit 22 and converted into digital data by the A/D converter 23 and image data to be displayed on a display unit 28. The memory 32 has a sufficient storage capacity to store a predetermined number of still images and a moving image and sound for a predetermined time.

The memory 32 also serves as a memory (video memory) for image display. A D/A converter 13 converts the image display data stored in the memory 32 into an analog signal and supplies it to the display unit 28. In this manner, image data for display written in the memory 32 is displayed on the display unit 28 via the D/A converter 13.

The display unit 28 includes the rear display panel 28a and the electronic viewfinder 28b as explained with reference to FIGS. 1A and 1B, each of which is a display device, such as an LCD or an organic EL, and performs display in accordance with an analog signal from the D/A converter 13. In this manner, the digital signal once A/D converted by the A/D converter 23 and stored in the memory 32 is converted into an analog signal by the D/A converter 13, and successively transferred to the rear display panel 28a or the electronic viewfinder 28b for display. Thus, the display unit 28 functions as an electronic viewfinder, and through image display (live view image display) on the display unit 28 can be performed.

A nonvolatile memory 56 is an electrically erasable/recordable recording medium, for example, an EEPROM or the like is used. In the nonvolatile memory 56, constants, variables, programs and the like for operation of the system control unit 50 are stored. Here, the programs include a computer program for executing processes shown in various flowcharts described later in this embodiment.

The system control unit 50 is a control unit having at least one processor and controls the entire image capturing apparatus 100. By executing the programs recorded in the above-mentioned nonvolatile memory 56, each processing of this embodiment to be described later is realized. As a system memory 52, a RAM is used to develop constants and variables for operation of the system control unit 50, programs read from the nonvolatile memory 56, and the like. The system control unit 50 also controls display on the rear display panel 28a and the electronic viewfinder 28b by controlling the memory 32, the D/A converter 13, the display unit 28, and so forth.

An eye-touch detection unit 57 is a sensor for detecting whether or not an eye is in contact with (or nearby) the electronic viewfinder 28b. Note that an eye does not necessarily have to be actually in contact with the electronic viewfinder 28b, and may detect whether there is any object such as an eye within a predetermined range (nearby) from the electronic viewfinder 28b. It is possible to judge whether or not the user is looking into the finder by the judgment of the eye-touch detection unit 57. Even without the eye-touch detection unit 57, whether or not the user is looking into the viewfinder may be determined based on whether or not the subject image can be visually recognized via the viewfinder. At this time, it may be configured such that the rear display panel 28a and the electronic viewfinder 28b can be manually switched by a user, and in a control that will be described later, when the user selects the electronic viewfinder 28b, it is handled in the same way as in the case where the touching of eye is detected.

The mode changeover switch 60, a shutter button 61, and the operation units 70 are operation means for inputting various operation instructions to the system control unit 50.

The mode changeover switch 60 switches the operation mode of the system control unit 50 to one of a still image recording mode, a moving image shooting mode, a playback mode, and the like. Examples of modes included in the still image recording mode include an auto shooting mode, an auto scene discrimination mode, a manual mode, various scene modes that cause different shooting settings for different shooting scenes, a program AE mode, and a custom mode. The mode changeover switch 60 is used to switch directly to one of these modes. Alternatively, after switching once to the shooting mode list screen with the mode changeover switch 60, one of the plurality of displayed modes may be selected and switched using another operating member. Similarly, a plurality of modes may be included in the moving image shooting mode.

A first shutter switch 62 is turned on in the middle of operation, so-called half-depression (shooting preparation instruction), of the shutter button 61 provided in the capturing apparatus 100, and generates a first shutter switch signal SW1. The system control unit 50 starts operations such as AF processing, AE processing, AWB processing, EF processing, etc., in response to the first shutter switch signal SW1.

A second shutter switch 64 is turned on by the completion of the operation, so-called full-depressing (photographing instruction), of the shutter button 61, and generates a second shutter switch signal SW2. The system control unit 50 starts a series of shooting operations from the signal reading from the image sensing unit 22 to the writing of the image data in the recording medium 200 in response to the second shutter switch signal SW2.

Each operation member of the operation units 70 is appropriately assigned a function for each scene by selecting one of various function icons displayed on the display unit 28, and functions as various function buttons. Examples of the function buttons include an end button, a return button, an image feed button, a jump button, a narrowing down button, an attribute change button, and the like. For example, when the menu button is depressed, various menu screens that can be set are displayed on the display unit 28. The user can intuitively make various settings using a menu screen displayed on the display unit 28, four direction buttons, namely, up, down, left and right directions, and a SET button.

A power supply control unit 80 includes a battery detection circuit, a DC-DC converter, a switch circuit for switching blocks to be energized, and the like, and detects the presence or absence of a battery installed, the type of battery, and the remaining battery level. Further, the power supply control unit 80 controls the DC-DC converter based on the detection result and an instruction from the system control unit 50, and supplies necessary voltages to each unit including the recording medium 200 for a necessary period.

A power supply unit 30 includes primary batteries such as alkaline batteries and lithium batteries, secondary batteries such as NiCd batteries, NiMH batteries and Li batteries, AC adapters, and the like.

A recording medium I/F 18 is an interface with a recording medium 200 such as a memory card or a hard disk. The recording medium 200 includes a memory card for recording captured images and is composed of a semiconductor memory, an optical disk, a magnetic disk, and so forth.

A communication unit 54 is connected to an external device by radio or via a wired cable, and performs transmission and reception of video signals, audio signals, and the like. The communication unit 54 can also connect to a wireless LAN (Local Area Network) and the Internet. The communication unit 54 can transmit an image (including a through image) captured by the image sensing unit 22 and an image recorded in the recording medium 200 to an external device, and can receive image data and other various information from an external device.

Further, in the present embodiment, as one of the above-described operation units 70, there is the touch panel 70a capable of detecting contact with the rear display panel 28a of the display unit 28. As the touch panel 70a, any one of various types of touch panels such as a resistance film type, a capacitance type, a surface acoustic wave type, an infrared type, an electromagnetic induction type, an image recognition type, an optical sensor type and the like may be used. There are a method of detecting that there is a touch when there is a contact with the touch panel, and a method of detecting that there is a touch due to the approach of the finger or a pen to the touch panel, and either method may be used.

The touch panel 70a and the rear display panel 28a can be integrally constructed. For example, the touch panel 70a may be configured so that its transmittance of light does not interfere with the display of the rear display panel 28a, and is attached to the upper layer of the display surface of the rear display panel 28a. Then, the input coordinates on the touch panel 70a is associated with the display coordinates on the rear display panel 28a. As a result, it is possible to configure a GUI (graphical user interface) as if a user can directly operate the screen displayed on the rear display panel 28a. The system control unit 50 can detect the following operation or state of the touch panel 70a.

A finger or a pen that did not touch the touch panel 70a newly touches the touch panel 70a. That is, the start of touch. Hereinafter, it is called "touch-down".

A finger or a pen is moving while touching the touch panel 70a. Hereinafter, it is called "touch-move".

Having released a finger or a pen that was touching the touch panel 70a. That is, the end of touch. Hereinafter referred to as "touch-up".

These operations/states and the position coordinates of the position where a finger or a pen is touching on the touch panel 70a are notified to the system control unit 50 via an internal bus. Based on the notified information, the system control unit 50 determines what operation (touch operation) has been performed on the touch panel 70a. With regard to touch-move, it is also possible to judge the movement direction of a finger or a pen moving on the touch panel 70a for vertical component/horizontal component independently on the touch panel 70a based on the change in position coordinates.

Figure 3A:
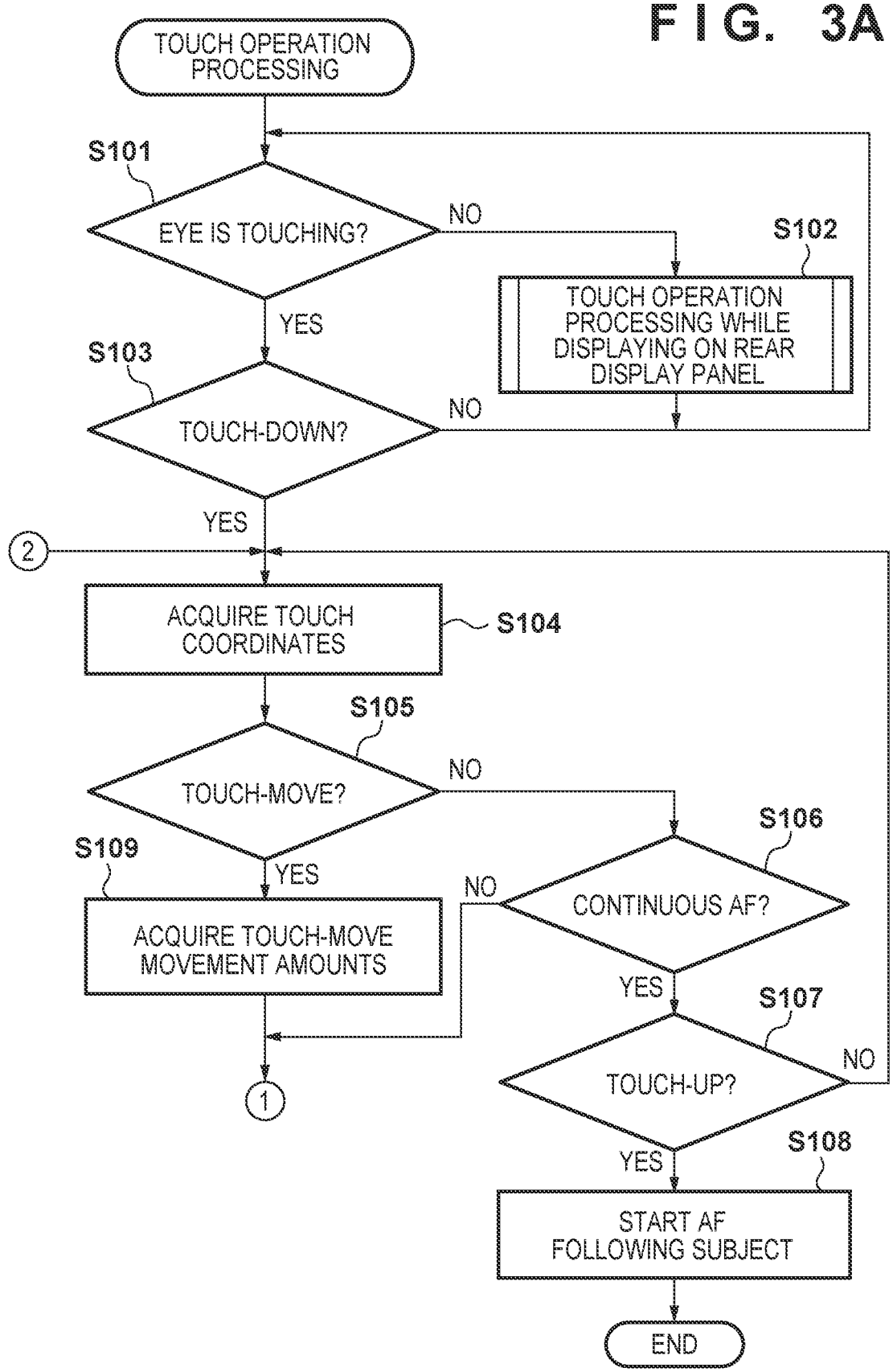
FIGS. 3A and 3B are flowcharts of touch operation processing when an eye is detected nearby according to a first embodiment.
Figure 3B:
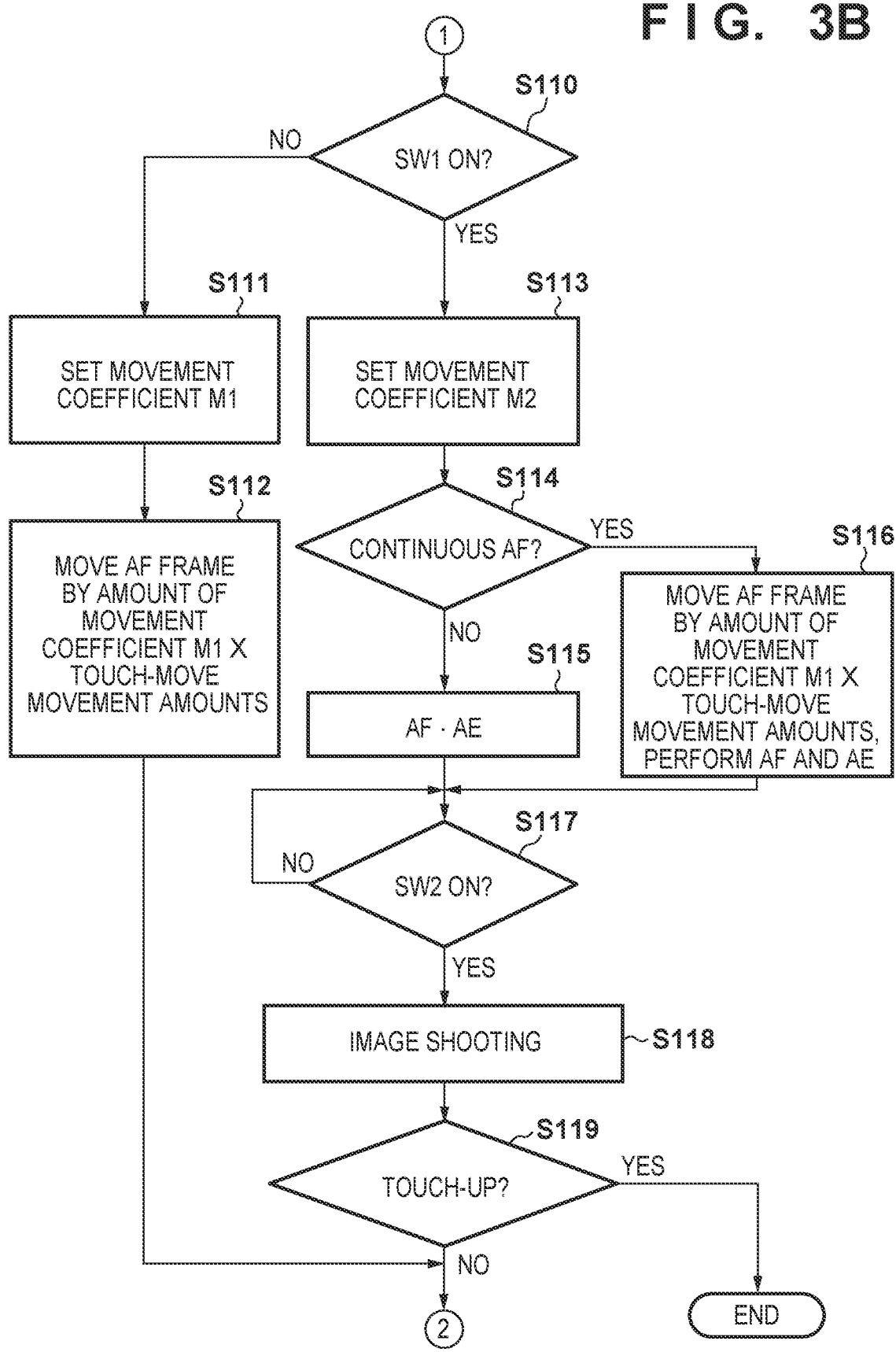

Next, a touch operation processing in the first embodiment will be described with reference to FIGS. 3A and 3B. This processing is realized by expanding a program recorded in the nonvolatile memory 56 to the system memory 52 and executing it by the system control unit 50. It should be noted that this processing is started when the power of the digital camera 100 is turned on. First, in step S101, it is judged by the eye-touch detection unit 57 whether an eye is touching (or detected nearby) the electronic viewfinder 28b or not. If the eye is not detected nearby, the process proceeds to step S102, and processing described below with reference to FIGS. 5A to 5F is performed.

Figure 5A:
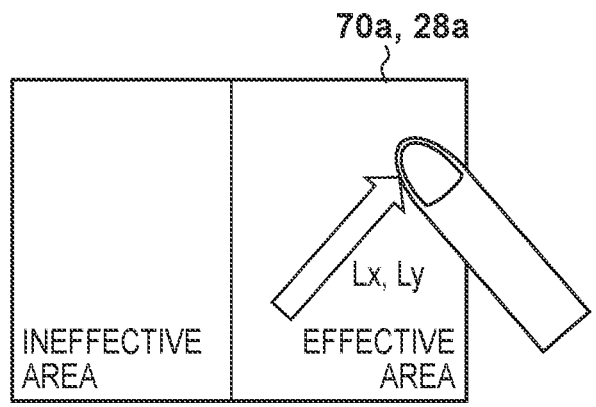
FIGS. 5A to 5F are diagrams showing an operation on the touch panel and movement of an AF frame displayed in an electronic viewfinder according to the first embodiment and modification.
Figure 5B:
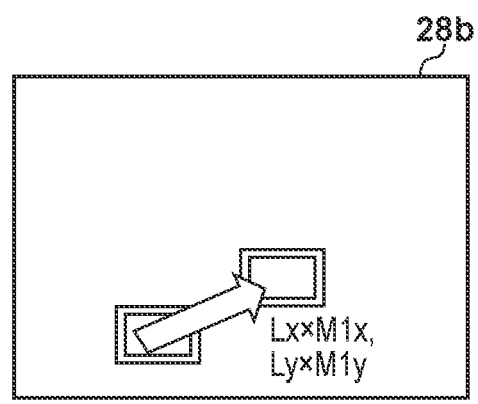
Figure 5C:
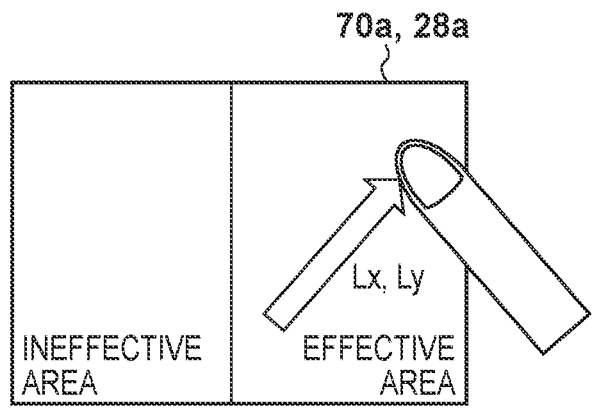

On the other hand, if the eye is detected nearby, the process proceeds to step S103, where the system control unit 50 sets an effective area for accepting the touch operation on the touch panel 70a, and it is determined whether touch-down (start of touch) is performed within the set effective area. In the first embodiment, as shown in FIGS. 5A and 5C, the right half of the touch panel 70a is set as the effective area, and the rest is set as the ineffective area. It should be noted that the effective area is not limited to the right half, and it may be set to a left half or a desired area that the user can easily operate.

If touch-down is not performed in step S103, the process returns to step S101. If touch-down is performed, the process proceeds to step S104 to acquire the touch coordinates indicating the touch position on the touch panel 70a. In the next step S105, the system control unit 50 determines whether a touch-move (movement of the touch position) has been made. Here, for example, the previous touch coordinates and the current touch coordinates are compared to judge whether the coordinates are coincident (stopped) or not, and if they do not coincide with each other, it is judged that a touch-move has been made. Also, in the case of the first loop, since there are no previous touch coordinates, it is judged that a touch-move has not been made. Incidentally, instead of determining whether or not the previous touch coordinates match the current touch coordinates, a certain threshold is set for the purpose of absorbing errors or reducing the processing load, and if the difference between the previous touch coordinates and the current touch coordinates is equal to or less than the threshold may be determined. If a touch-move has been made, the process proceeds to step S109, and if not, the process proceeds to step S106.

In step S106, the system control unit 50 determines whether or not continuous AF is set. On the menu screen, the user can select and set either of continuous AF (constantly focusing on a moving subject, for example) which continuously adjusts the focus on the subject or one-shot AF in which focusing is performed once in accordance with the shooting preparation instruction. The one-shot AF specifies the position to be focused, focuses on the position on the composition aimed at by the user, and does not change the in-focus position (lens position) during half-depression. With the continuous AF, it is possible to keep focusing on the position specified by the user. In the first embodiment, in one-shot AF (first focus control), the in-focus position is fixed by adjusting the focus when the shutter button 61 is half depressed (SW 1 ON). In the continuous AF (servo AF, second focus control), since the AF processing is performed so as to always focus on a designated position, if composition is shifted after the shutter button 61 is half depressed or the position of a desired subject is shifted, the desired subject may become out of focus. To cope with this problem, by allowing the AF position to be changed even after the shutter button 61 is half depressed, focusing on the desired subject is made possible even when the subject is displaced. If the servo AF is set, the process proceeds to step S107. If the servo AF is not set, that is, if one-shot AF is set, the process proceeds to step S110.

In step S107, the system control unit 50 determines whether the touch-up has been made (whether the touch is released). If touch-up has not been made, the process returns to step S104 and the above-described process is repeated, and touch-up has been made, the process proceeds to step S108. In step S108, the continuous AF is started for the subject at the current touch coordinate position, and the process is terminated.

On the other hand, if a touch-move has been made, in step S109, the system control unit 50 acquires touch-move movement amounts Lx and Ly for vertical and horizontal components of the touch panel 70a. Here, the movement amounts are acquired from the differences between the previous touch coordinates and the current touch coordinates, and the flow proceeds to step S110. In step S110, the system control unit 50 determines whether the shutter button 61 is half depressed (SW1 ON, shooting preparation instruction) or not. If it is not half-depressed, the process goes to step S111, and the system control unit 50 sets a movement coefficient to M1 that is used at the normal time. The movement coefficient M1 is composed of coefficients (M1$x$, M1$y$) to multiply the vertical component and the horizontal component of the touch-move movement amounts Lx and Ly, respectively. Then, in step S112, the touch-move movement amounts Lx and Ly acquired in step S109 are multiplied by the movement coefficient M1, and the AF frame indicating the focus detection area displayed on the electronic viewfinder 28b is moved by obtained AF frame movement amounts Lx×M1$x$, Ly×M1$y$, from the previous display position. After the movement, the process returns to step S104.

If it is determined in step S110 that the shutter button 61 is half depressed, the process proceeds to S113, and the system control unit 50 sets the movement coefficient to the movement coefficient M2, which is larger than M1, for the half-pressed state of the shutter button 61. Similar to the movement coefficient M1, the movement coefficient M2 is composed of coefficients (M2$x$, M2$y$) to multiply the vertical and the horizontal components of the touch-move movement amounts. Then, in step S114, the system control unit 50 determines whether or not the continuous AF is set. If the continuous AF is not set, the process proceeds to step S116. In step S116, the touch-move movement amounts Lx and Ly acquired in step S109 are multiplied by the movement coefficient M2, and the AF frame indicating the focus detection area displayed on the electronic viewfinder 28b is moved by obtained AF frame movement amounts Lx×M2$x$, Ly×M2$y$, from the previous display position. Since the continuous AF is set, AF is performed for the moved AF frame and AE processing is also performed so that the subject in the moved AF frame is appropriately exposed. The continuous AF allows to move the AF frame even after the shutter button 61 is half depressed so that focus can be adjusted even when a desired subject has moved. In the above embodiment, after acquiring the movement amounts of the touch position, it is determined whether or not the shooting preparation instruction is issued in step S110. However, the present invention is not limited to this, and the movement amounts of the touch position may be acquired after determining whether or not shooting preparation instruction has been issued, and the AF frame may be moved by the amount obtained by multiplying the movement amounts of the touch position by the corresponding movement coefficients. Further, it is determined whether or not the shooting preparation instruction (half-depression of the shutter button 61) is released, and when released, the movement coefficient is returned to M1.

On the other hand, if the one-shot AF is set, the process proceeds to step S115, where the system control unit 50 fixes the AF frame indicating the focus detection area to be displayed on the electronic viewfinder 28b at the position currently displayed. Then, AF processing and AE processing are performed on the focus detection area corresponding to the fixed AF frame.

In step S117, it is determined whether the shutter button 61 is fully pressed (SW2 ON) or not. If it is not fully pressed, the judgment of step S117 is repeated, and when it is fully pressed, the procedure goes to step S118 to perform image shooting. Thereafter, in step S119, it is determined whether touch-up has been made. If touch-up has been made, the process is terminated, and if touch-up has not been made, the process returns to step S104.

Figure 5D:
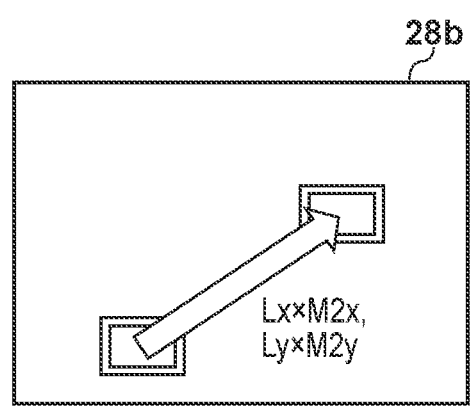

Here, a specific example of the processing in step S112 and the processing in step S116 will be described with reference to FIGS. 5A to 5F. FIGS. 5A and 5B show the case where the shutter button 61 is not half-depressed, FIGS. 5C and 5D show the case where the shutter button 61 is half-depressed, and shows a display example in the viewfinder 28b. The effective area shown in FIGS. 5A and 5C represents an area on the touch panel 70a for accepting a touch operation for moving the AF frame as described above, and its size can be set in the menu screen. This is because the nose tends to contact with the touch panel when the user looks into the electronic viewfinder 28b and furthermore it is difficult to reach the left end of the touch panel by the finger in a state where the user holds the grip. For example, by halving the effective area, erroneous operation due to nose contact can be prevented, and operability of the user can be improved.

When the user hold the camera at the ready for image shooting, the user supports the lens part with the left hand, presses the shutter button 61 with the right hand (pressing operation for shooting instruction), and performs touch operation on the touch panel 70a and operations on other buttons on the back. In the case of performing the touch operation in the state where the shutter button 61 is half depressed, the operation on the touch panel is performed with the index finger of the right hand placed at the position of the shutter button 61. While the shutter button 61 is being pressed, the set values of the aperture value and the shutter speed are held, but if the half-pressed state of the shutter button is released, these set values will not be retained. Therefore, by improving the operability of half-depression of the shutter button and setting of the AF position by touch operation as in the above-described embodiment, it is possible for the user to facilitate image shooting at a desired set value.

As shown in FIGS. 5A and 5C, even when a touch-move is performed for the same distance in the effective area, the distance (FIG. 5D) by which the AF frame moves when the shutter button 61 is half depressed is larger than the distance (FIG. 5B) by which the AF frame moves when the shutter button 61 is not depressed. In this way, in a case where the shutter button 61 is half-depressed, the system control unit 50 moves the AF frame a longer distance than in a case where the shutter button 61 is not half-depressed even if the touch-move movement amounts are the same.

Figure 4:
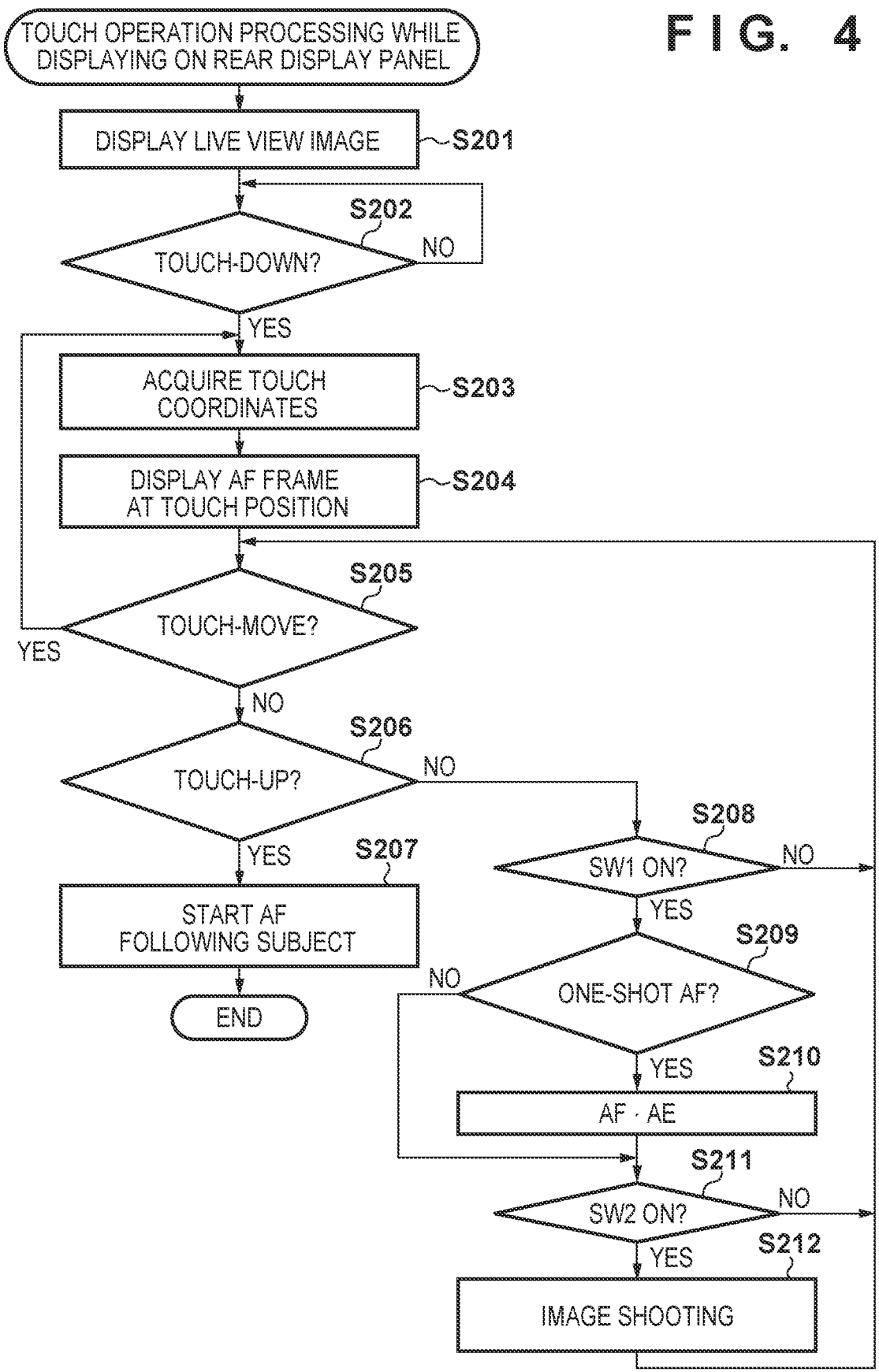
FIG. 4 is a flowchart of a touch operation process when an eye is not detected nearby according to the first and second embodiments.

Next, with reference to FIG. 4, a description will be given of processing performed in step S102 when an eye is not detected nearby. This processing is realized by expanding the program recorded in the nonvolatile memory 56 to the system memory 52 and executing it by the system control unit 50. It should be noted that this processing starts when the process proceeds to step S102 in FIG. 3A. First, in step S201, a live view image is displayed on the rear display panel 28a. Next, in step S202, the system control unit 50 determines whether touch-down has been made. If touch-down has not been made, the process of step S202 is repeated, and if touch-down has been made, the process goes to step S203.

In step S203, the system control unit 50 acquires the touch coordinates indicating the touch position on the touch panel 70a, and displays the AF frame at the position of the touch coordinates on the rear display panel 28a in step S204. Next, in step S205, the system control unit 50 determines whether a touch-move has been made. If a touch-move has not been made, the process proceeds to step S205. If a touch-move has been made, the process returns to step S203, and the above process is repeated.

In step S206, the system control unit 50 determines whether or not touch-up has been made. If touch-up has not been made, the process proceeds to step S208, and if touch-up has been made, the process proceeds to step S207. In step S207, the continuous AF is started to focus on the subject included in the displayed AF frame, and the process is terminated. If the one-shot AF is set, the process of step S207 is not performed, and the process proceeds to step S208.

In step S208, the system control unit 50 determines whether the shutter button 61 is half-depressed (SW1 ON) or not. If it is not half depressed, the process returns to step S205 and the above-described process is repeated. If YES in step S208, the flow advances to step S209 to judge whether the one-shot AF is set or not. If the one-shot AF is set, in step S210, the system control unit 50 fixes the focus detection area to the position of the displayed AF frame and performs AF processing and AE processing on the fixed focus detection area.

On the other hand, if the one-shot AF is not set, changing operation of the AF position is accepted until immediately before shooting, and AF processing and AE processing are performed. In step S211, it is determined whether the shutter button 61 is fully depressed (SW2 ON) or not. If the shutter button 61 is not fully pressed, the process returns to step S205 and repeats the above-described process. If it is fully pressed, the process proceeds to step S212 and image shooting is performed, and then the process returns to step S205.

According to the first embodiment as described above, in the case where the shutter button is half depressed, compared with the case where the shutter button is not half depressed, the AF frame can be moved a longer distance even if the touch-move movement amounts on the touch panel operation are the same. In addition, it is possible to reduce the possibility that image shooting is performed at an unintended timing when the user extends the finger. This makes it possible to improve the operability for operating the touch panel in a state of half-depressing an operating member such as a shutter button.

<Modification>

In the first embodiment described above, it is explained that in the case where the shutter button 61 is half depressed when an eye is detected nearby, by setting a movement coefficient larger than that in the case where the shutter button 61 is not pressed, the AF frame is moved for a longer distance than in the case where the shutter button 61 is not pressed.

Figure 5E:
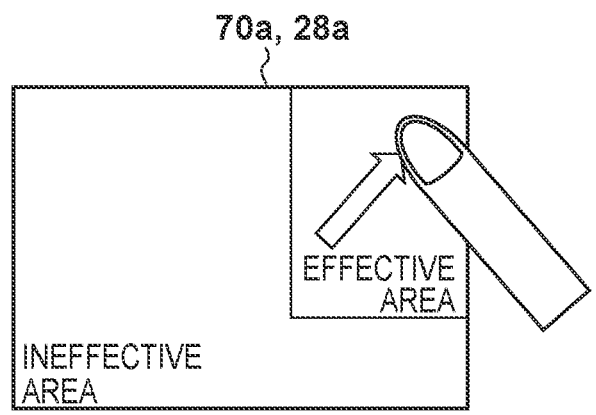
Figure 5F:
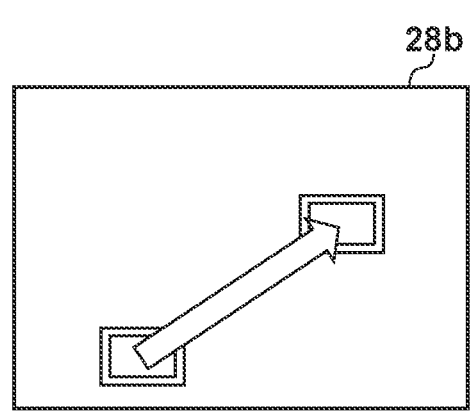

By contrast, by changing the size of the effective area instead of the movement coefficient, the movement distance of the AF frame during half-depression of the shutter button may be lengthened. FIGS. 5E and 5F show a case where the effective area of the touch on the touch panel 70a is changed instead of setting the different movement coefficient.

In the case where the shutter button 61 is half depressed, the effective area is the right half area of the touch panel 70a in FIG. 5C, whereas in FIG. 5E, the effective area is set to a partial area on the upper right portion of the touch panel 70a. In both FIGS. 5C and 5E, if a touch-move is performed from one end to the other end of the effective area, the AF frame can be moved from one end to the other end of the electronic viewfinder 28b. That is, the effective area corresponds to the entire area of the electronic viewfinder 28b, and by changing the size of the touch effective area, the movement amount of the AF frame with respect to the touch-move distance can be changed.

The touch-move distances are different between the case of FIG. 5C and the case of FIG. 5E, and the touch-move distance in FIG. 5E is shorter, however, the same moving distance of the AF frame can be resulted in both cases.

<Second Embodiment>

Next, a second embodiment of the present invention will be described. Since the second embodiment is also applicable to the image capturing apparatus 100 described with reference to FIGS. 1A and 1B and FIG. 2 in the first embodiment, the description of the image capturing apparatus 100 will be omitted.

Figure 7A:
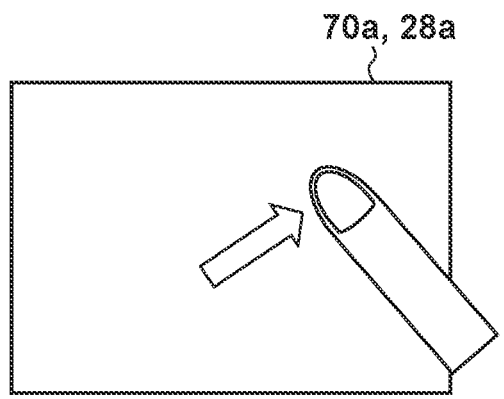
FIGS. 7A to 7D are diagrams showing an operation on the touch panel and movement of the AF frame displayed in the electronic viewfinder in the case of absolute position operation and relative position operation according to the second embodiment.
Figure 7B:
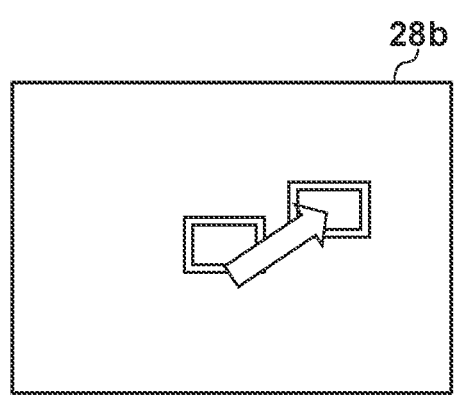
Figure 7C:
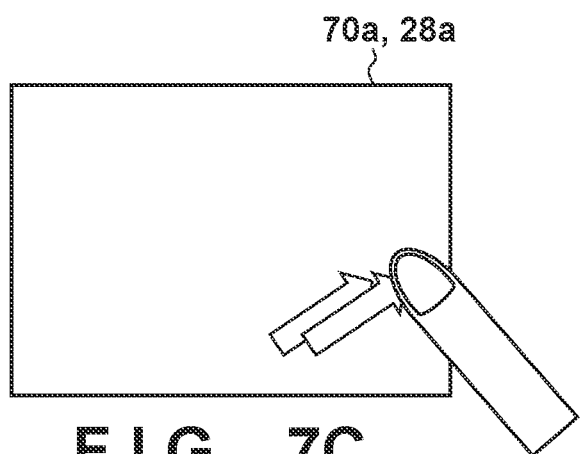
Figure 7D:
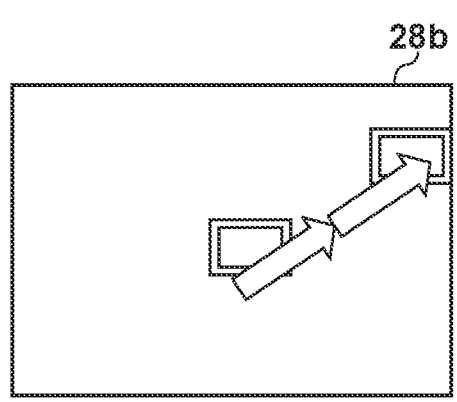

In the second embodiment, another control when specifying the position of the AF frame to be displayed on the electronic viewfinder 28b by using the touch panel 70a will be described. In the second embodiment, two operation methods are provided for a method of designating the position of the AF frame using the touch panel 70a. One is an "absolute position operation" method (first operation) that moves the AF frame representing the focus detection area to the position on the electronic viewfinder 28b corresponding to the touch position on the touch panel 70a as shown in FIGS. 7A and 7B. The other is a "relative position operation" method (second operation) that moves the AF frame on the electronic viewfinder 28b according to the distance of dragging on the touch panel 70a as shown in FIGS. 7C and 7D. The "absolute position operation" makes it possible to perform more direct and quicker operation, but if the finger does not reach the desired position on the touch panel 70a, it can not designate that position. The "relative position operation" can designate any area on the electronic viewfinder 28b by repeating the drag operation on the touch panel 70a even if a range where the finger can reach is limited, but requires a relatively large number of operations to move the AF frame.

Figure 6A:
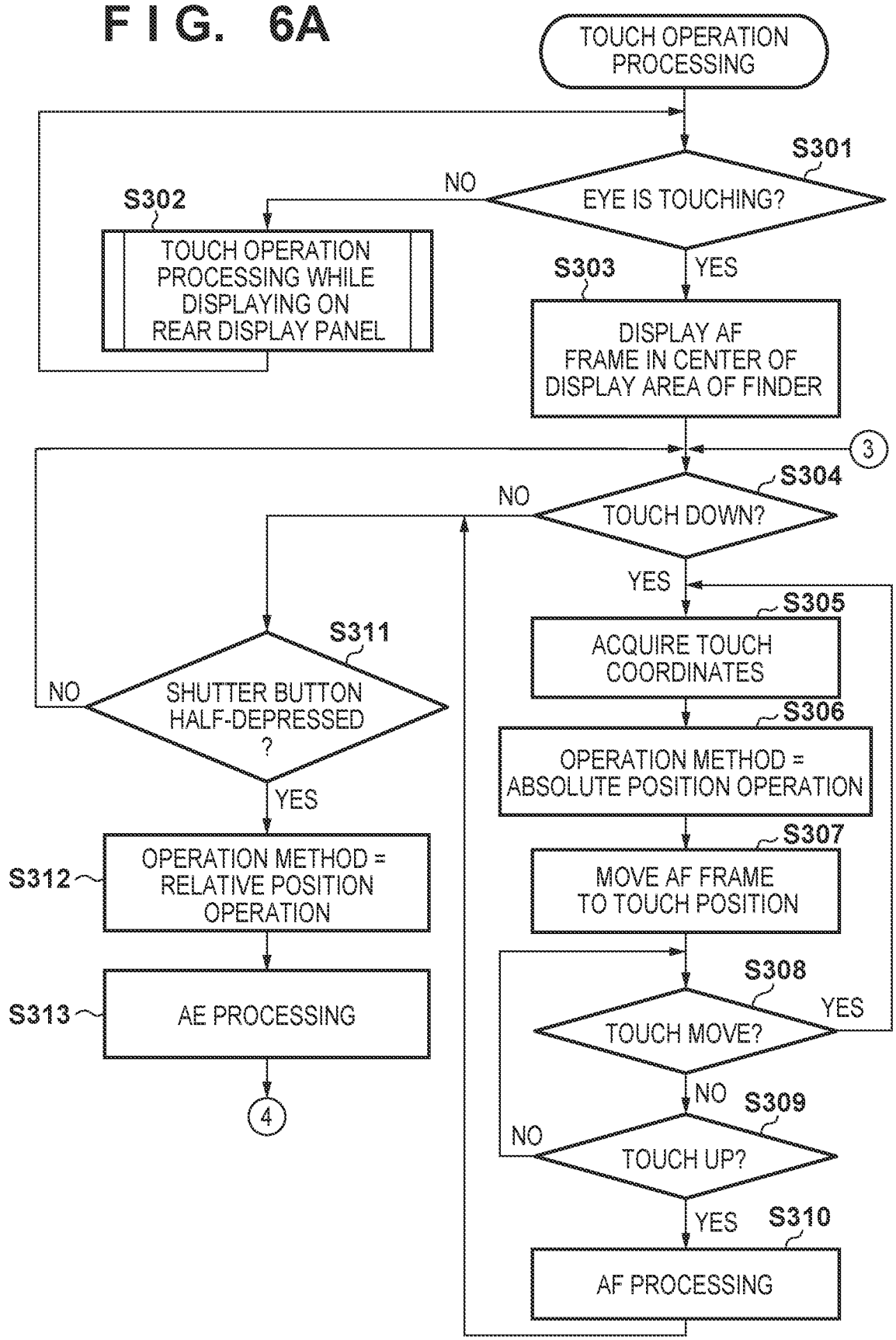
FIGS. 6A and 6B are flowcharts of a touch operation process when an eye is detected nearby according to the second embodiment.
Figure 6B:
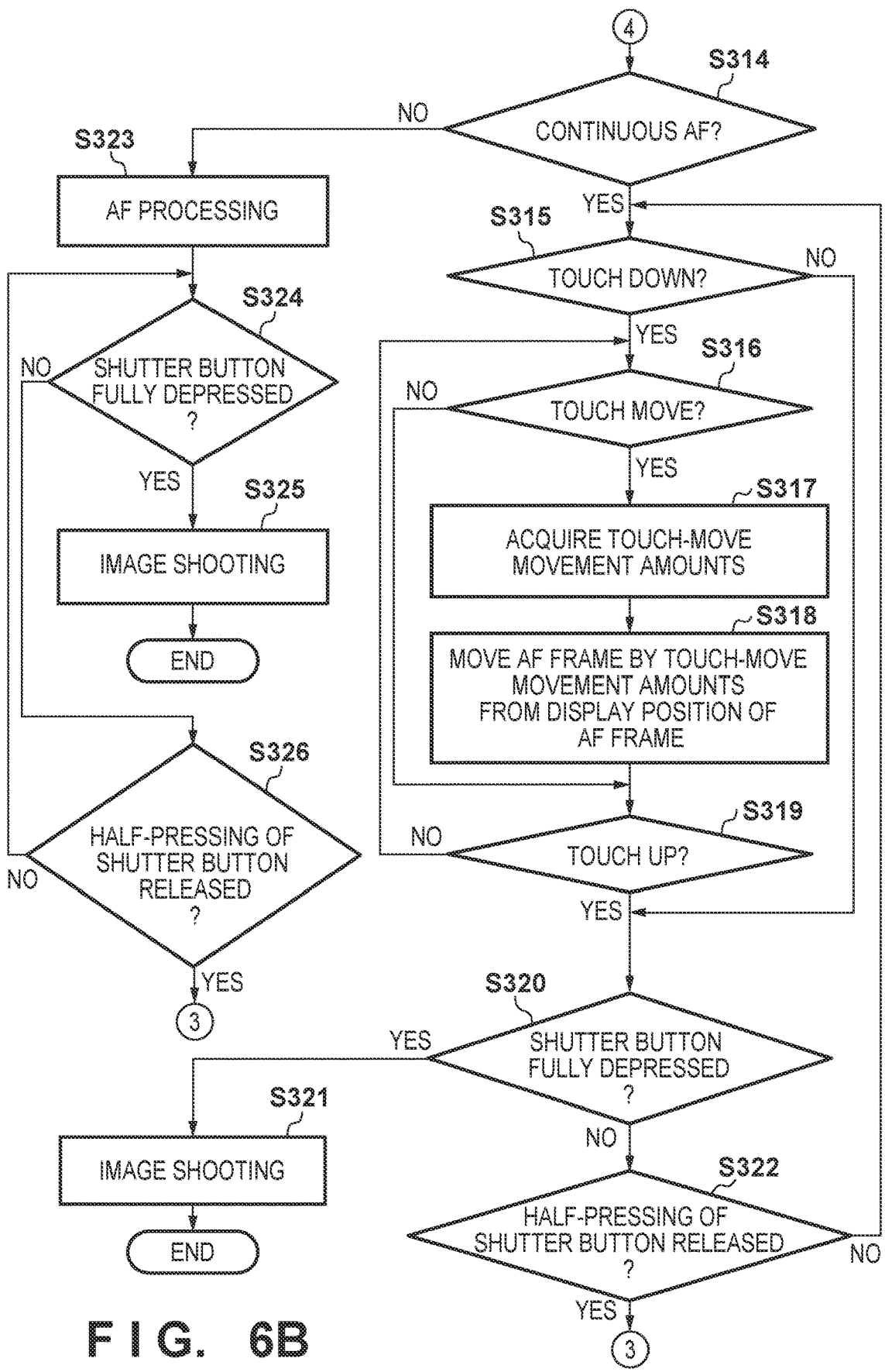

Next, touch operation processing in the second embodiment will be described with reference to FIGS. 6A and 6B. This processing is realized by expanding the program recorded in the nonvolatile memory 56 to the system memory 52 and executing it by the system control unit 50. It should be noted that this processing is started when the power of the digital camera 100 is turned on.

In step S301, it is judged by the eye-touch detection unit 57 whether an eye is touching (or detected nearby) the electronic viewfinder 28b or not. If the eye is not detected nearby, the process proceeds to step S302, and processing described above with reference to FIGS. 5A to 5F is performed.

On the other hand, if the eye is detected nearby, in step S303, the system control unit 50 displays an AF frame indicating the current focus detection area in the center of the electronic viewfinder 28b. Next, in step S304, the system control unit 50 determines whether touch-down has been made. If touch-down has not been made, the process proceeds to step S311. If touch-down has been made, the process proceeds to step S305 to acquire the touch coordinates indicating the touch position on the touch panel 70a.

Next, in step S306, the system control unit 50 sets the operation method to the "absolute position operation". In step S307, the system control unit 50 moves the AF frame to the position on the electronic viewfinder 28b corresponding to the current touch coordinates, and proceeds the process to step S308.

In step S309, the system control unit 50 determines whether or not the touch has been released. If it is determined that the touch has been released, the process proceeds to step S310, and if not, the process returns to step S308.

In step S310, the system control unit 50 performs AF processing. If the user selects the one-shot AF as the AF processing, the AF processing is performed on the position (where the AF frame is displayed) selected in step S310, and the lens position (in-focus position) is fixed. On the other hand, if the user selects the continuous AF, the AF processing is started from step S310 so that the focus is always on the selected position (where the AF frame is displayed). That is, the AF processing started in step S310 continues until the AF position is changed.

In step S311, the system control unit 50 determines whether the shutter button 61 is half depressed (SW1 ON, shooting preparation instruction) or not. If the shutter button 61 is not half-depressed, the process goes to step S304.

If it is determined in step S311 that the shutter button 61 is half pressed, the process proceeds to step S312, and the system control unit 50 sets the "relative position operation" as the operation method. Thereafter, in step S313, the system control unit 50 performs AE processing. In step S312, photometric processing is performed, and the aperture value and shutter speed are set based on the photometric result. The setting values set in step S312 is not changed (i.e., held) until the half-depression of the shutter button 61 is released. Even if the shutter button 61 is half depressed before touch-up is detected in step S304, the process proceeds to step S312. It is to be noted that when the relative position operation is set, the touch effective area may be made narrower than in the case where the absolute position operation is set.

In step S314, the system control unit 50 determines whether or not the servo AF is set. If the servo AF is set, the process proceeds to step S315, otherwise proceeds to step S323.

In step S315, the system control unit 50 determines whether touch has been started (touch-down). If it is determined that the touch-down has been made, the process proceeds to step S316, otherwise proceeds to step S320.

In step S316, the system control unit 50 determines whether touch-move (movement of the touch position) has been made. If touch-move has been made, the process proceeds to step S317, and if touch-move has not been made, the process proceeds to step S319.

In step S317, the system control unit 50 acquires the touch-move movement amounts Lx and Ly for each of vertical and horizontal components of the touch panel 70a.

Then, in step S318, the system control unit 50 moves the AF frame displayed on the electronic viewfinder 28b from the previous display position by the amount corresponding to the movement amounts Lx and Ly acquired in step S317, and proceeds to step S319. In the case of the continuous AF, since the AF processing is continuously performed at the moved position of the AF frame, the AF processing based on the position of the moved AF frame is started anew.

In step S319, the system control unit 50 determines whether touch-up has been made (whether the touch has been released). If touch-up has not been made, the process goes to step S320. If touch-up has been made, the process returns to step S316 and the process of moving the AF frame according to touch-move is repeated.

In step S320, the system control unit 50 determines whether the shutter button 61 is fully depressed (SW2 ON) or not. If it is not fully depressed, the process proceeds to step S322, and if it is fully depressed, the process proceeds to step S322 to perform image shooting.

In step S321, the system control unit 50 performs photographing processing. The image captured in the state focused on the AF position selected by the user with the setting value for image shooting, such as the aperture value, at the time of half pressing the shutter button 61 is recorded in the recording medium 200.

In step S322, the system control unit 50 determines whether half-depression of the shutter button 61 has been released. If it is determined that the half-depression of the shutter button 61 is released, the process returns to step S304, and if not, the process returns to step S315.

In step S323, the system control unit 50 performs AF processing. Since in step S323, it has been determined "No" in step S314, it is assumed here that the one-shot AF is set. In the case of one-shot AF, the AF processing is performed again in response to the shooting preparation instruction, and when the shutter button 61 is half-depressed, the in-focus state is fixed at that position (i.e., focusing process is not repeated at the AF position).

In step S324, the system control unit 50 determines whether the shutter button 61 is fully depressed (SW2 ON) or not. If it is not fully depressed, the process proceeds to step S326, and if it is fully depressed, the process proceeds to step S325 to perform image shooting.

In step S325, the system control unit 50 performs shooting processing in the same manner as in step S321.

In step S326, the system control unit 50 determines whether half-depression of the shutter button 61 has been released. If it is determined that the half-depression of the shutter button 61 is released, the process returns to step S304, and if not, the process returns to step S324.

According to the second embodiment as described above, relative coordinates are set in the state where the shutter button is half-depressed, and thus, even if the finger does not reach the position desired by the user, it is possible to perform desired setting by performing the touch-move operation. In addition, it is possible to reduce the possibility that image shooting is performed at an unintended timing when the user extends the finger. This makes it possible to improve the operability for operating the touch panel in a state of half-depressing an operating member such as a shutter button.

In the above-described embodiment, in the case of the continuous AF, switching between the absolute position operation and the relative position operation is performed before and after the shutter button 61 is half-depressed, but in addition to this, the movement coefficient may be reduced at the time of switching to the relative position operation.

That is, before the half-depressed state, the AF frame is moved by a second distance in accordance with the movement of the touch position of a first distance, and in the half-pressed state, the AF frame is moved by a third distance shorter than the second distance in accordance with the movement of the touch position of the first distance. Since the user sets the position to focus before half-depressing the shutter button 61, the position is changed after half-depressing, since it is a case where the subject has slightly moved, etc., the AF position is greatly changed Possibility is low. Since the possibility of finer adjustment of the AF position is more enhanced during half-depression, the movement coefficient is made smaller, making it easier to adjust the AF position to the desired subject by making the change more easily.

In the above embodiment, the case where the "absolute position operation" is set in step S307 when the shutter button 61 is not half-depressed has been described, however, the present invention is not limited to this. For example, one of the "absolute position operation" and the "relative position operation" may be selected in advance by using the operation unit 70, and when the shutter button 61 is not half-depressed, the operation selected by the user may be performed. Even in that case, when the shutter button 61 is half-depressed, the operation method is switched to the "relative position operation" regardless of the operation method specified by the user. Thus, even in a case where the touch operation range is limited when the shutter button 61 is half-depressed, the AF position can be designated at an arbitrary position.

In the present embodiment, the operation target is the AF frame for indicating the AF position, however, in the case of the image capturing apparatus having the subject recognition, the operation target may be the specified subject. In that case, if the set operation method is the "absolute position operation", the subject at the position corresponding to the touch position is designated. In a case where the set operation method is the "relative position operation", an operation indicator is displayed in advance, the displayed operation indicator is moved by the drag operation, and after a predetermined time has elapsed after touch-up, the subject is designated.

Further, in the above embodiment, the operation methods of the "absolute position operation" and the "relative position operation" are switched in accordance with the presence/absence of half-depression of the shutter button 61. However, in a case where the operation method previously designated by the user is the "relative position operation", when the shutter button 61 is half-depressed, it may be controlled so that the moving distance of the AF frame by the drag operation is amplified as described in the first embodiment.

Further, in a case where the "relative position operation" is set, an effective area and an ineffective area may be set on the touch panel 70*a* as shown in FIGS. 5A and 5C. In addition, in a case where the "absolute position operation" is performed when an eye is detected nearby, an effective area corresponding to the whole area of the electronic viewfinder 28*b* is set so that the position can be specified within a narrower area, thereby enhancing operability.

Figure 8A:
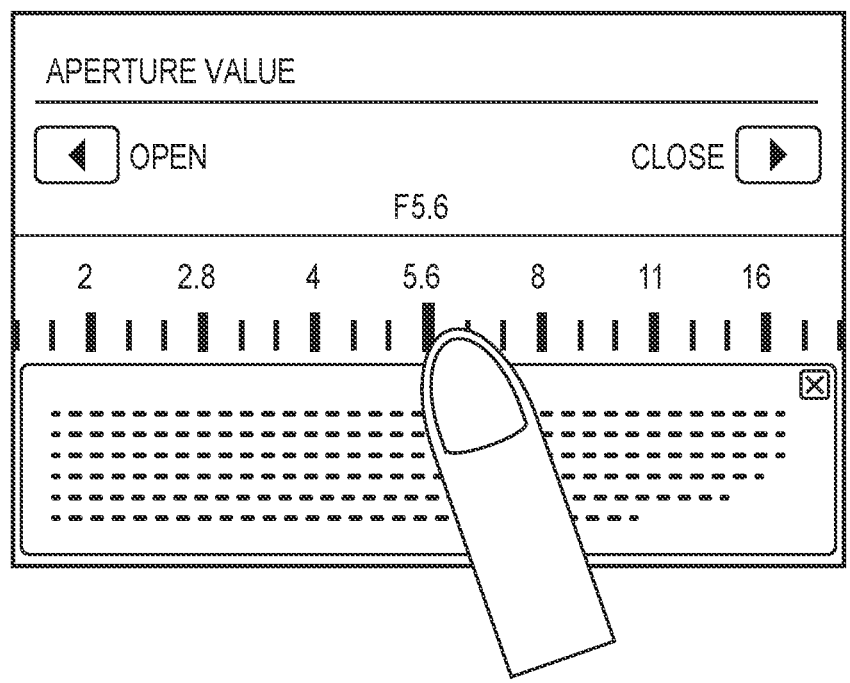
FIGS. 8A and 8B are views showing an example of a touch operation process when an eye is not detected nearby according to the embodiment.
Figure 8B:
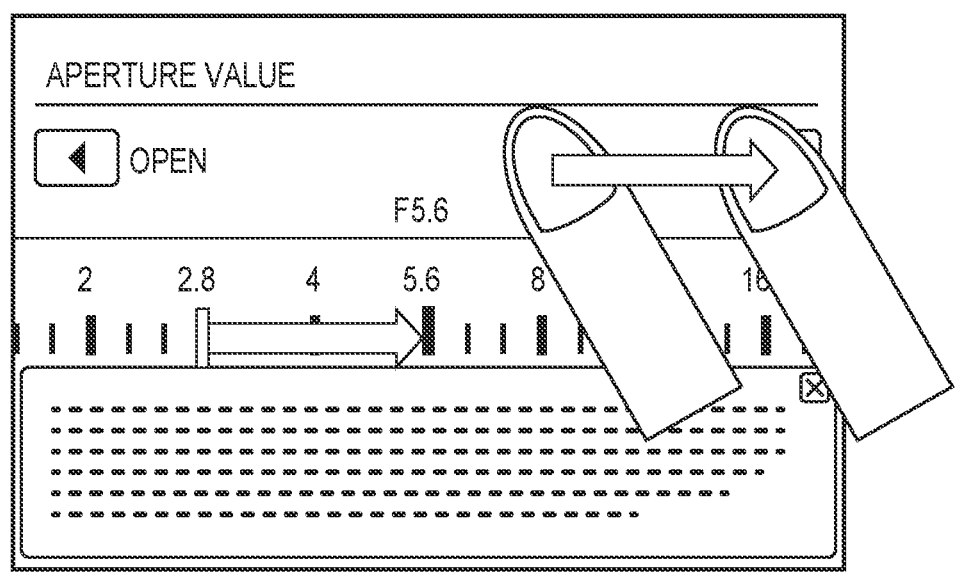

In the example described above, it is described that the processing relating to the touch operation is changed while the shutter button 61 is half-depressed depending on whether or not an eye is detected nearby to the viewfinder. However, regardless of whether an eye is detected nearby or not, the above-described embodiment may be applied. In addition to the AF frame, the present invention may be applied to the case of setting, for example, ISO sensitivity, an exposure value, a white balance correction value, and the like. FIGS. 8A and 8B show a case where the aperture value is controlled by performing a touch operation on the display unit 28 as an example. FIG. 8A shows a case where the shutter button 61 is not half-depressed, and FIG. 8B shows a case where the shutter button 61 is half-depressed. In both FIGS. 8A and 8B, the user performs a touch operation while watching the display of the display unit 28. FIG. 8A shows a state before the shutter button 61 is half-depressed, and a setting value at the touched position on the bar that accepts the setting of the aperture value is set. FIG. 8B shows a state when the shutter button 61 is half-depressed. Even if the finger of a user can reach positions of signs that indicate exposure values such as 2.8 or 4 are displayed before the shutter button 61 is half-depressed, there is a high possibility that the finger will not reach the positions of signs that indicate those exposure values when the shutter button 61 is half-depressed. Therefore, while the shutter button 61 is half-depressed, by setting the relative coordinate input, even if the user does not reach the position of the desired set value, it becomes possible to set the desired setting. At this time, the movement coefficient may be set larger than when the absolute coordinates are input. In this manner, when the shutter button 61 is half-depressed, control based on the relative position operation is made possible, whereby operability can be improved.

Further, in the above-described embodiment, when the shutter button 61 is half-depressed, a change in the operation amount or a change in the operation method may be indicated by displaying icons or the like in the electronic viewfinder 28*b*. By doing so, it is possible to intelligibly inform the user of the change.

Further, in the above-described embodiment, the case where the display operation is switched in response to half-depression of the shutter button 61 has been described. However, the present invention is not limited to this. Instead of the shutter button, any operation member capable of accepting a touch operation in a state in which the operation member is half-depressed may be used. Such operation member includes an AF button and a button that changes a function corresponding to a touch operation when half-depressed. Further, the present invention can be applied to a case where a predetermined set value can be set by a touch operation depending on a state in which a button is pressed or a state in which a predetermined part is touched. For example, the above-described embodiment is applicable to a case where, by the touch operation to the touch panel 70*a*, setting of the AF position is accepted when the menu button is not depressed and setting of the set value of the ISO sensitivity is accepted when the menu button is depressed. In other words, in a case where it becomes impossible to change the desired setting when the depressed state of the button is released, by setting the relative coordinate input and increasing the movement coefficient, desired settings can be made even if the range the finger can reach is possible is limited. Further, the present invention can also be applied to a case where a predetermined set value can be changed by a touch operation in a state in which a predetermined portion is touched instead of a button. In such case, if the touch position shifts, desired setting values may not be changed, however, according to the above-described embodiment, the user can change desired setting values.

Note that the above-described various kinds of control described as being performed by the system control unit 50 may be performed by one piece of hardware, or the entire apparatus may be controlled by sharing processing among a plurality of pieces of hardware.

Although the present invention has been described in detail based on preferred embodiments thereof, it is to be understood that the present invention is not limited to these specific embodiments, and various embodiments within the scope not departing from the gist of the present invention included. Furthermore, each of the above-described embodiments is merely embodiments of the present invention, and these embodiments can be combined as appropriate.

Further, in the above-described embodiments, the case where the present invention is applied to the image capturing apparatus 100 has been described as an example, however, the present invention is not limited to this example, and is applicable to an apparatus that can perform setting by a touch operation. That is, the present invention is applicable to a mobile phone terminal, a portable image viewer, a printer device including a finder, a digital photo frame, a music player, a game machine, an electronic book reader, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-023472, filed on Feb. 10, 2017 which is hereby incorporated by reference herein in its entirety.

What is claimed is:

1. An image capturing apparatus comprising:
 a first display capable of displaying a predetermined item and being seen through a finder;
 a detection unit that detects a touch operation on a touch panel;
 an operation unit capable of being operated by a finger of a same hand of another finger that is operating the touch panel provided at a position different from the positions of the first display and the operation unit; and
 a control unit that control to
  while a predetermined operation that is pressing the operation unit is not made to the operation unit and a subject image is seen through the finder, display the predetermined item at a position on the first display based on a position at which touch is started on the touch panel, not based on a display position of the predetermined item before the touch is started, in response to the touch operation detected by the detection unit, and
  while the predetermined operation is made to the operation unit and the subject image is seen through the finder, display the predetermined item on the first display at a position moved from the position where the predetermined item is displayed before the touch position is moved by an amount corresponding to the moved amount of the touch position, and not to move the predetermined item in response to starting of the touch.

2. The image capturing apparatus according to claim 1, wherein the operation unit is a shutter button.

3. The image capturing apparatus according to claim 2, wherein the predetermined operation is half-depression of the shutter button.

4. The image capturing apparatus according to claim 1, wherein processing relating to image shooting is performed in response to the predetermined operation.

5. The image capturing apparatus according to claim 1, wherein a setting value of setting relating to image shooting including one of an aperture value and shutter speed is stored while the predetermined operation is performed.

6. The image capturing apparatus according to claim 1, wherein the control unit controls to set a distance by which the predetermined item is moved on the first display in response to a touch position on the touch panel being moved by a first distance, shorter while the predetermined operation is made to the operation unit than while the predetermined operation is not made to the operation unit.

7. The image capturing apparatus according to claim 1, wherein the control unit controls to set an area on the touch panel to accept a touch operation for moving the predetermined item on the first display narrower while the predetermined operation is made to the operation unit than while the predetermined operation is not made to the operation unit.

8. The image capturing apparatus according to claim 1, wherein the touch panel is integrally provided on a second display that is different from the first display, and
 in a case where the predetermined item is displayed on the second display, regardless of the predetermined operation being made to the operation unit or not, the control unit controls to display the predetermined item at a position on the second display based on a position at which touch is started on the touch panel, not based on the display position of the predetermined item before the touch is started, in response to the touch operation detected by the detection unit.

9. The image capturing apparatus according to claim 1 further comprising a nearby object detection unit that detects an object existing near the finder,
 wherein, while the nearby object detection unit detects an object existing near the finder and the predetermined operation is not made to the operation unit, the control unit controls to display the predetermined item at a position on the first display based on a position at which touch is started on the touch panel, not based on the display position of the predetermined item before the touch is started, in response to the touch operation detected by the detection unit, and while the predetermined operation is made to the operation unit, the control unit controls not to move the predetermined item even if touch is started, and if the touch position is moved, move the predetermined item to a position by an amount corresponding to the moved amount of the touch position from the position where the predetermined item is displayed before the touch position is moved.

10. The image capturing apparatus according to claim 9, wherein the touch panel is integrally provided on a second display that is different from the first display, and in a case where no object is detected near the finder, regardless of the predetermined operation being made to the operation unit or not, the control unit controls to display the predetermined item at a position on the second display based on a position at which touch is started on the touch panel, not based on the display position of the predetermined item before the touch is started, in response to the touch operation detected by the detection unit.

11. The image capturing apparatus according to claim 1, wherein an AF processing is performed based on the display position of the predetermined item.

12. The image capturing apparatus according to claim 1, wherein the predetermined item indicates a position at which continuous AF for performing focusing processing so as to always focus on a set AF position is performed.

13. The image capturing apparatus according to claim 12, wherein, in a case where the display position of the predetermined item indicates a position at which one-shot AF is to be performed and the predetermined operation is accepted, the display position of the predetermined item is not moved on the first display if the touch position on the touch panel is moved.

14. The image capturing apparatus according to claim 1, wherein the predetermined item indicates a setting value of a predetermined setting item.

15. The image capturing apparatus according to claim 14, wherein the predetermined setting item is any of ISO sensitivity, an exposure value, and a white balance correction value.

16. An image capturing apparatus comprising:
a display that displays a predetermined item and being seen through a finder;
a detection unit that detects a touch operation on a touch panel;
an operation unit capable of being operated by a finger of a same hand of another finger that is operating the touch panel provided at a position different from the positions of the first display and the operation unit; and
a control unit that, when a subject image is seen through the finder, in response to a touch position on the touch panel being moved by a first distance, controls a distance by which the predetermined item is moved on the display is made longer while a predetermined operation that is pressing of the operation unit is made by the finger of the same hand to the operation unit than while the predetermined operation is not made to the operation unit.

17. A control method of an image capturing apparatus having a display capable of displaying a predetermined item and being seen through a finder, comprising:

performed by a detection unit of detecting a touch operation on a touch panel;
performed by an operation unit capable of being operated by a finger of a same hand of another finger that is operating the touch panel provided at a position different from the positions of the first display and the operation unit; and
performed by a control unit of controlling to
while a predetermined operation that is pressing of the operation unit is not made in the operation step and a subject image is seen through the finder, display the predetermined item at a position on the display based on a position at which touch is started on the touch panel, not based on a display position of the predetermined item before the touch is started, in response to the touch operation detected in the detection step, and
while the predetermined operation is made in the operation step and a subject image is seen through the finder, display the predetermined item on the first display at a position moved from the position where the predetermined item is displayed before the touch position is moved by an amount corresponding to the moved amount of the touch position, and not to move the predetermined item in response to starting of the touch.

18. A control method of an image capturing apparatus having a display capable of displaying a predetermined item and being seen through a finder, comprising:
performed by a detection unit of detecting a touch operation on a touch panel;
performed by an operation unit capable of being operated by a finger of a same hand of another finger that is operating the touch panel provided at a position different from the positions of the first display and the operation unit; and
performed by a control unit of controlling, when a subject image is seen through the finder, in response to a touch position on the touch panel being moved by a first distance, a distance by which the predetermined item is moved on the display is made longer while a predetermined operation that is pressing of the operation is made in the operation step than while the predetermined operation is not made in the operation step.

19. A non-transitory readable storage medium having stored thereon a program which is executable by an image processing apparatus, the program having a program code for realizing a control method of an image capturing apparatus having a display capable of displaying a predetermined item and being seen through a finder, comprising:
performed by a detection unit of detecting a touch operation on a touch panel;
performed by an operation unit capable of being operated by a finger of a same hand of another finger that is operating the touch panel provided at a position different from the positions of the first display and the operation unit; and
performed by a control unit of controlling to
while a predetermined operation that is pressing of the operation unit is not made in the operation step and a subject image is seen through the finder, display the predetermined item at a position on the display based on a position at which touch is started on the touch panel, not based on a display position of the predetermined item before the touch is started, in response to the touch operation detected in the detection step, and while the predetermined operation is made in the operation step and a subject image is seen through the finder, display the predetermined item on the first display at a position moved from the position where the predetermined item is displayed before the touch position is moved by an amount corresponding to the moved amount of the touch position, and not to move the predetermined item in response to starting of the touch.

20. A non-transitory readable storage medium having stored thereon a program which is executable by an image processing apparatus, the program having a program code for realizing a control method of an image capturing apparatus having a display capable of displaying a predetermined item and being seen through a finder, comprising:

performed by a detection unit of detecting a touch operation on a touch panel;

performed by an operation unit capable of being operated by a finger of a same hand of another finger that operates is operating the touch panel provided at a position different from the positions of the first display and the operation unit; and performed by a control unit of controlling, when a subject image is seen through the finder, in response to a touch position on the touch panel being moved by a first distance, a distance by which the predetermined item is moved on the display is made longer while a predetermined operation that is pressing of the operation is made in the operation step than while the predetermined operation is not made in the operation step.

* * * * *